US012666405B2

(12) United States Patent　　　　　　(10) Patent No.:　　US 12,666,405 B2
Abotabl et al.　　　　　　　　　　　　　(45) Date of Patent:　　　Jun. 23, 2026

(54) TBS ADJUSTMENT AND ADAPTATION FOR MULTIPLE AND REPEATED TRANSMISSIONS IN FULL DUPLEX NETWORKS

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 18/167,806

(22) Filed: Feb. 10, 2023

(65) Prior Publication Data

US 2024/0276461 A1　　　Aug. 15, 2024

(51) Int. Cl.
　　*H04W 72/0446*　　　(2023.01)
　　*H04L 5/14*　　　　　(2006.01)
　　*H04W 72/0453*　　　(2023.01)
(52) U.S. Cl.
　　CPC ........... *H04W 72/0446* (2013.01); *H04L 5/14* (2013.01); *H04W 72/0453* (2013.01)
(58) Field of Classification Search
　　CPC ......... H04W 72/0453; H04W 72/0446; H04L 5/14; H04L 1/0009
　　See application file for complete search history.

(56) References Cited

U.S. PATENT DOCUMENTS

| | | | |
|---|---|---|---|
| 2019/0082431 A1* | 3/2019 | Yi | H04L 5/0055 |
| 2021/0297999 A1* | 9/2021 | Kim | H04W 72/0453 |
| 2021/0377982 A1* | 12/2021 | Yang | H04W 72/23 |
| 2022/0256572 A1* | 8/2022 | Kim | H04W 72/23 |
| 2023/0023719 A1* | 1/2023 | Ji | H04W 16/28 |
| 2023/0309105 A1* | 9/2023 | Yi | H04W 72/0446 |
| 2023/0354347 A1 | 11/2023 | Kim et al. | |
| 2024/0049130 A1* | 2/2024 | Lee | H04W 52/0216 |
| 2024/0064717 A1* | 2/2024 | Yoshimura | H04W 8/24 |

FOREIGN PATENT DOCUMENTS

| | | |
|---|---|---|
| WO | 2021212295 A1 | 10/2021 |
| WO | 2022010314 A1 | 1/2022 |

OTHER PUBLICATIONS

International Search Report and Written Opinion—PCT/US2024/013223—ISA/EPO—May 7, 2024.

(Continued)

*Primary Examiner* — Brian D Nguyen
(74) *Attorney, Agent, or Firm* — Procopio, Cory, Hargreaves & Savitch

(57)　　　　　　ABSTRACT

Method and apparatus for TBS adjustment and adaptation for multiple and repeated transmissions in full duplex networks. The apparatus receives an allocation of resources across multiple slots scheduling multiple transmissions or multiple receptions. The apparatus determines a TBS adjustment based on the multiple transmissions or the multiple receptions. The multiple receptions comprise repetitions across different slot types. The TBS adjustment is based on half duplex slots and is maintained for all slots.

28 Claims, 13 Drawing Sheets

1000

(56) References Cited

OTHER PUBLICATIONS

Kim Y (Samsung)., et al., "SBFD Feasibility and Design Considerations for NR Duplex Evolution", 3GPP DRAFT, 3GPP TSG-RAN WG1 Meeting #111, R1-2212043, Type Discussion, FS_NR_DUPLEX_EVO, 3rd Generation Partnership Project, Mobile Competence Centre, 650, Route Des Lucioles, F-06921 Sophia-Antipolis Cedex, France, vol. 3GPP RAN 1, No. Toulouse, France, Nov. 14, 2022-Nov. 18, 2022, Nov. 7, 2022, XP052222608, 27 pages, section I.

Merias P (Moderator (CATT))., et al., "Summary #2 of Subband Non-Overlapping Full Duplex", 3GPP TSG RAN WG1 #111, R1-2212734, Type Discussion, FS_NR_DUPLEX_EVO, 3rd Generation Partnership Project (3GPP), Mobile Competence Centre, 650, Route Des Lucioles, F-06921, Sophia-Antipolis Cedex, France, vol. 3GPP RAN 1, No. Toulouse, FR, Nov. 14, 2022-Nov. 18, 2022, Nov. 17, 2022, XP052223281, 108 pages, Section 3.1.2.4.2.

\* cited by examiner

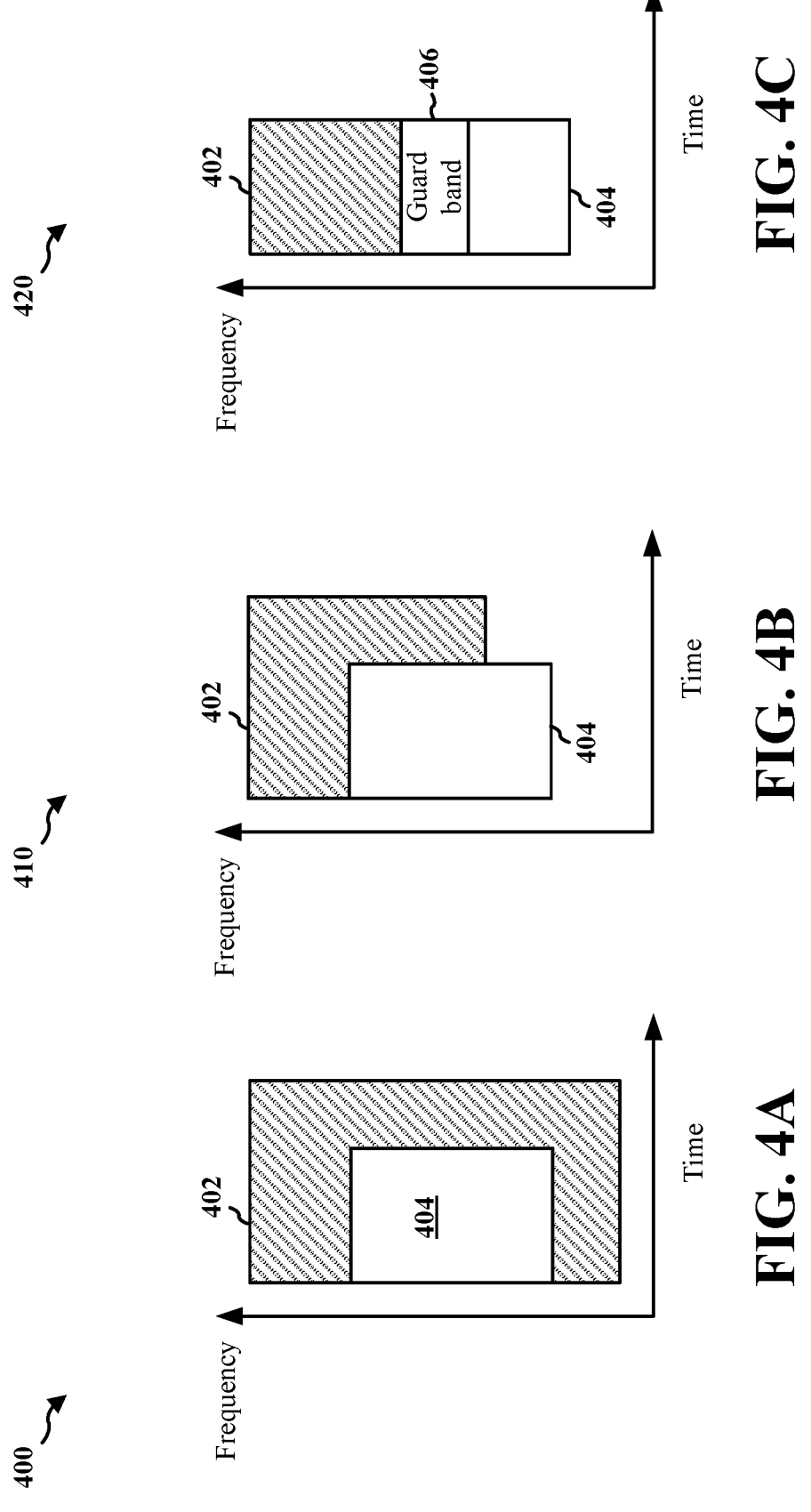

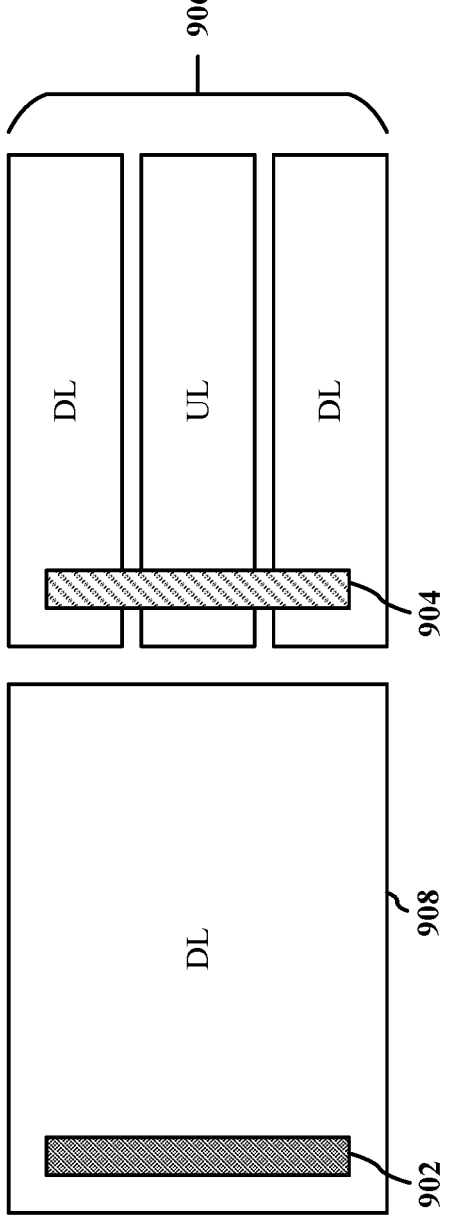
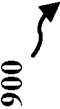
FIG. 9

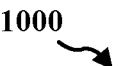
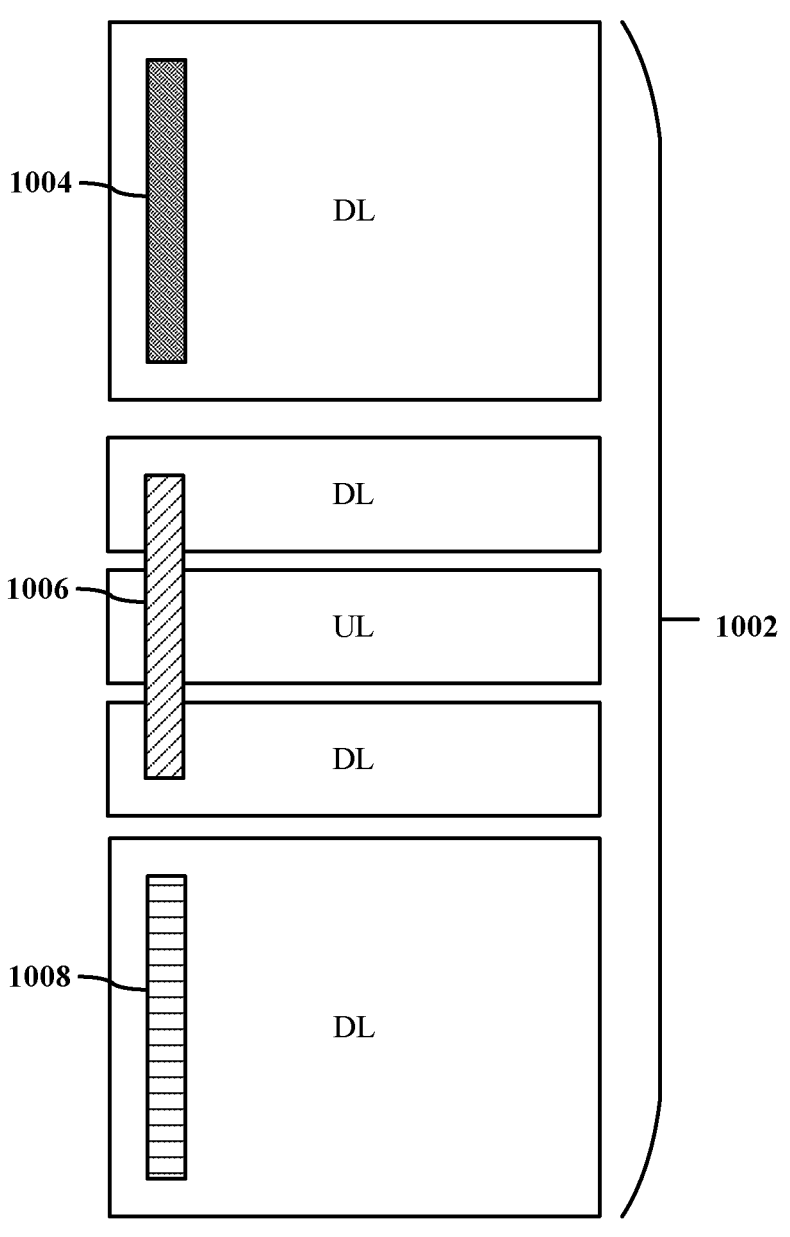
FIG. 10

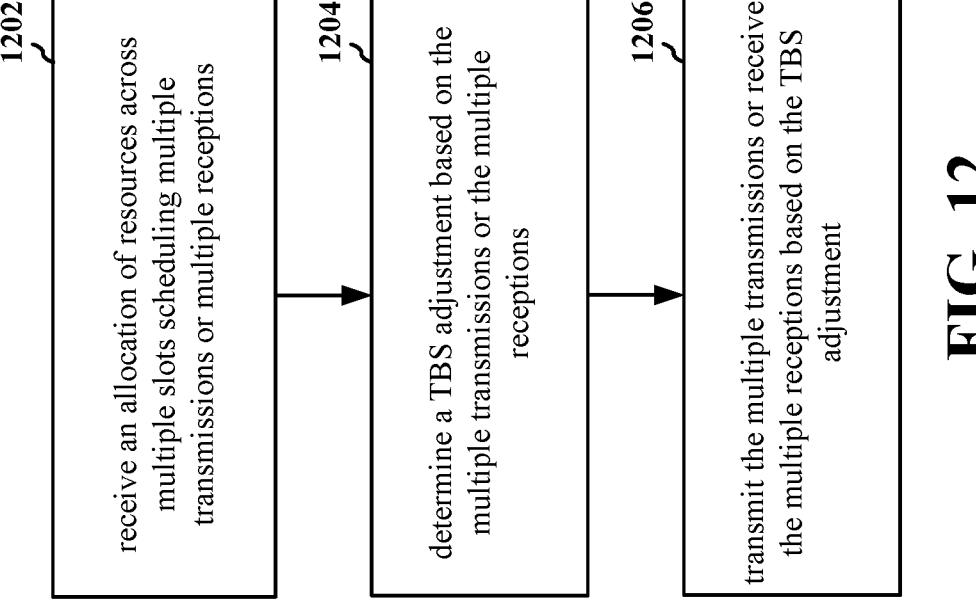
1202
receive an allocation of resources across multiple slots scheduling multiple transmissions or multiple receptions
1204
determine a TBS adjustment based on the multiple transmissions or the multiple receptions
1206
transmit the multiple transmissions or receive the multiple receptions based on the TBS adjustment
FIG. 12
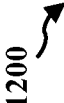
1200

TBS ADJUSTMENT AND ADAPTATION FOR MULTIPLE AND REPEATED TRANSMISSIONS IN FULL DUPLEX NETWORKS

TECHNICAL FIELD

The present disclosure relates generally to communication systems, and more particularly, to a configuration for TBS adjustment and adaptation for multiple and repeated transmissions in full duplex networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives an allocation of resources across multiple slots scheduling multiple transmissions or multiple receptions. The apparatus determines a transport block size (TBS) adjustment based on the multiple transmissions or the multiple receptions.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIGS. 4A-4C are diagrams illustrating examples of full duplex communication.

FIG. 9 is a diagram illustrating an example of a TBS adjustment.

FIG. 10 is a diagram illustrating an example of a TBS adjustment.

FIG. 12 is a flowchart of a method of wireless communication.

DETAILED DESCRIPTION

Figure 1:
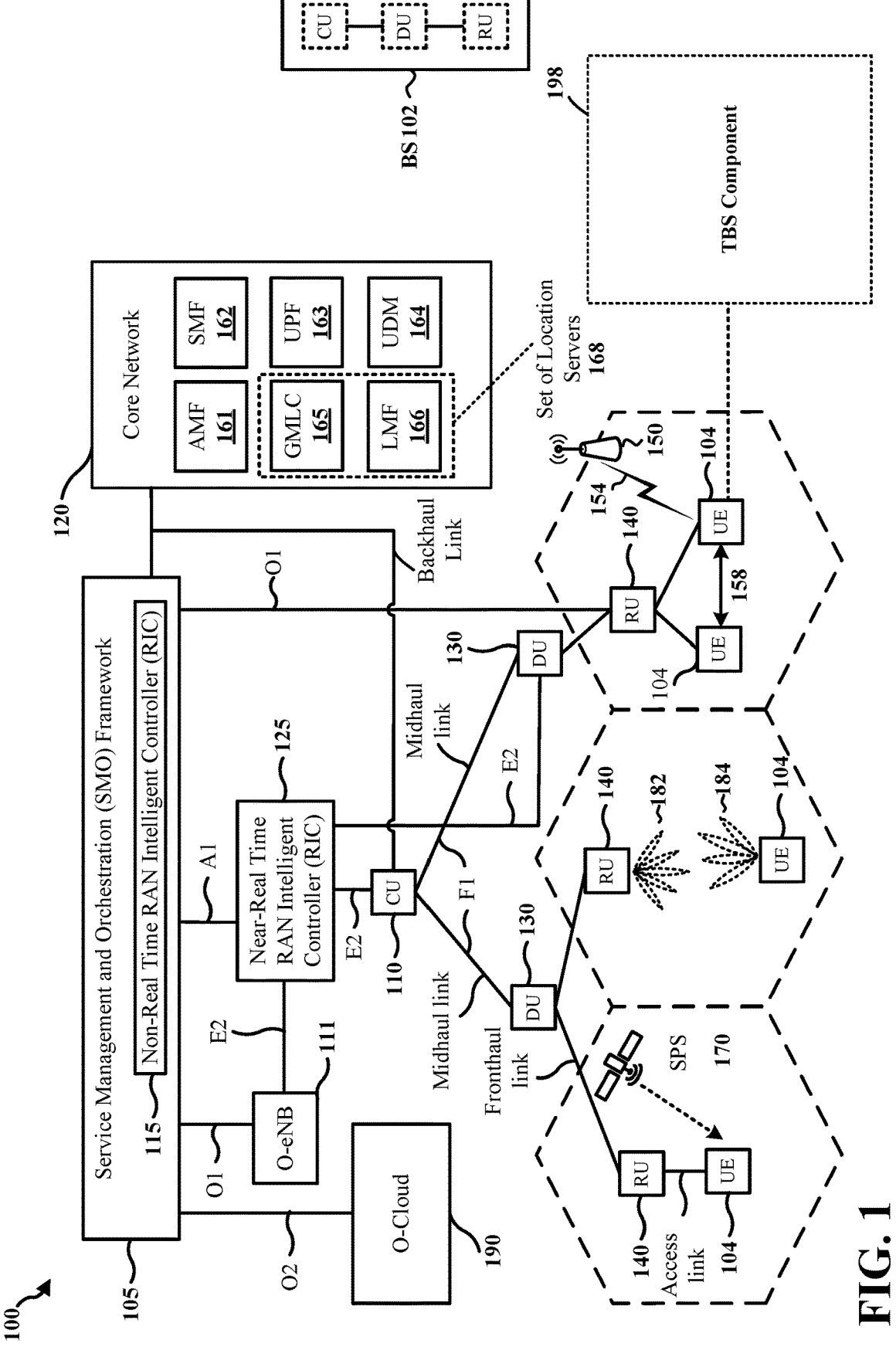
FIG. 1 is a diagram illustrating an example of a wireless communications system and an access network.

In wireless communication, full duplex (FD) capability may be present at base stations, UEs, or both. At least one advantage of FD operation is a reduction of latency for communication. For example, FD operation may allow for the reception of downlink communication in uplink only slots, which may enable the downlink communication to be received more quickly and reduce latency. At least another advantage of FD operation may include an enhancement of spectrum efficiency per cell or per UE, as well as an increase in resource utilization. In wireless communications, a UE receiving data via physical downlink shared channel (PDSCH) determines the size of the TBS prior to decoding the data. The UE may utilize information provided via radio resource control (RRC) signaling and/or downlink control indicator (DCI) over a physical downlink control channel (PDCCH) based on the scheduling. To determine the TBS, the UE determines the number of resource elements (REs) within the slot. The UE determines the number of resource elements allocated for PDSCH within a physical resource block (PRB). The UE may also determine the total number of REs allocated for PDSCH.

In some instances, subband full duplex (SBFD) slots may have two disjoint downlink allocations or two disjoint uplink allocations. The two downlink/uplink disjoint bands may be separated by a large uplink/downlink band in addition to any guard bands. In some instances, a TBS adjustment may occur and may be based on at least one of the slot type, an allocation type, or the allocation itself. An issue may arise in the determination of the TBS and/or adjustment in instances with multiple PDSCH transmissions or PDSCH repetitions, across multiple slots, where some slots are half duplex slots and some slots are full duplex slots.

Aspects presented herein provide a configuration for TBS adjustment and adaptation for multiple and repeated transmissions in full duplex networks. A UE may be configured to determine a TBS adjustment for multiple and repeated PUSCH or PDSCH across multiple slots.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUS), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a TBS component 198 configured to receive an allocation of resources across multiple slots scheduling multiple transmissions or multiple receptions; and determine a TBS adjustment based on the multiple transmissions or the multiple receptions.

Although the following description may be focused on 5G NR, the concepts described herein may be applicable to other similar areas, such as LTE, LTE-A, CDMA, GSM, and other wireless technologies.

Figures 2A, 2B, 2C, 2D:
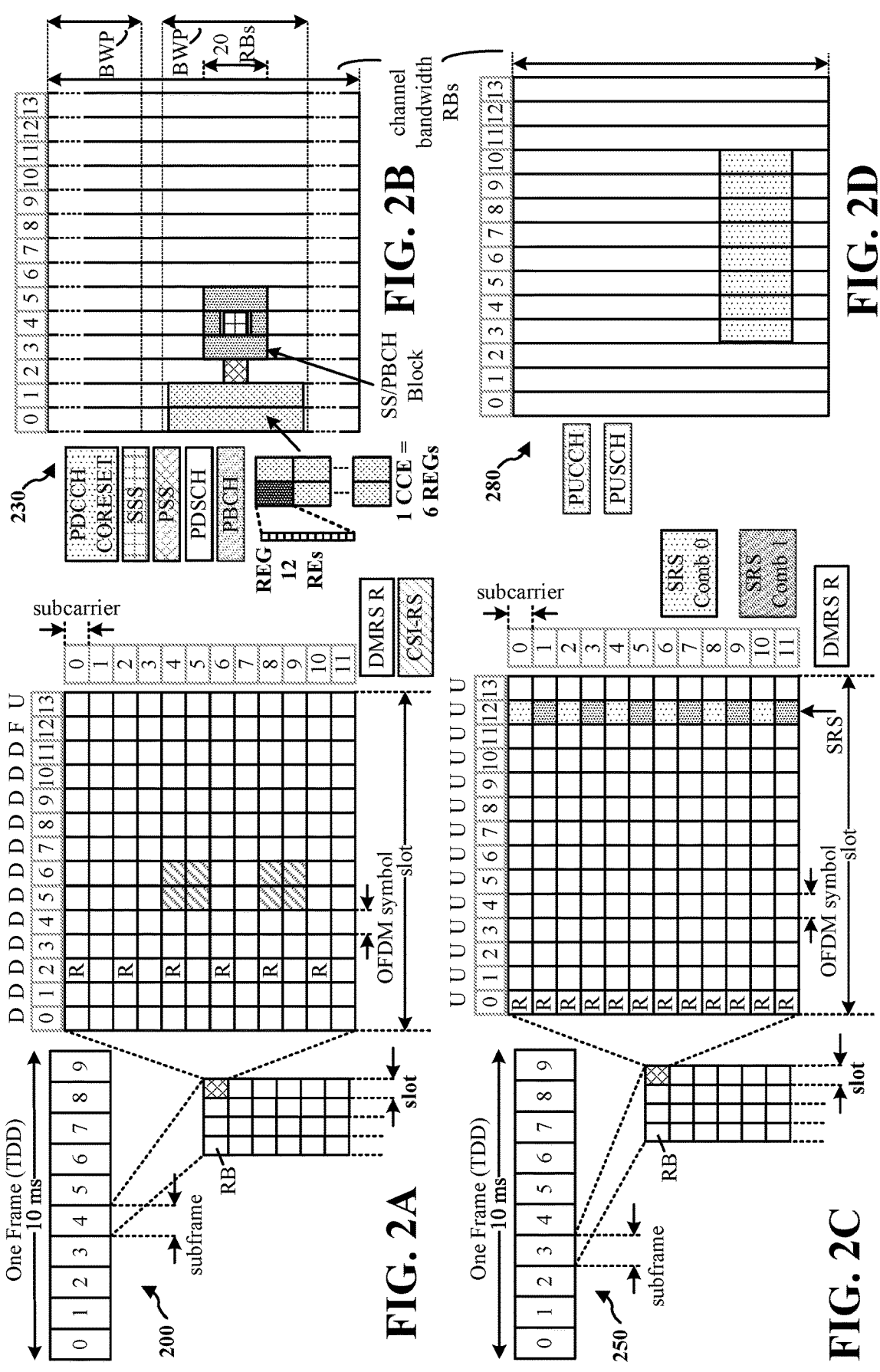
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2μ slots/subframe. The subcarrier spacing may be equal to 2μ*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
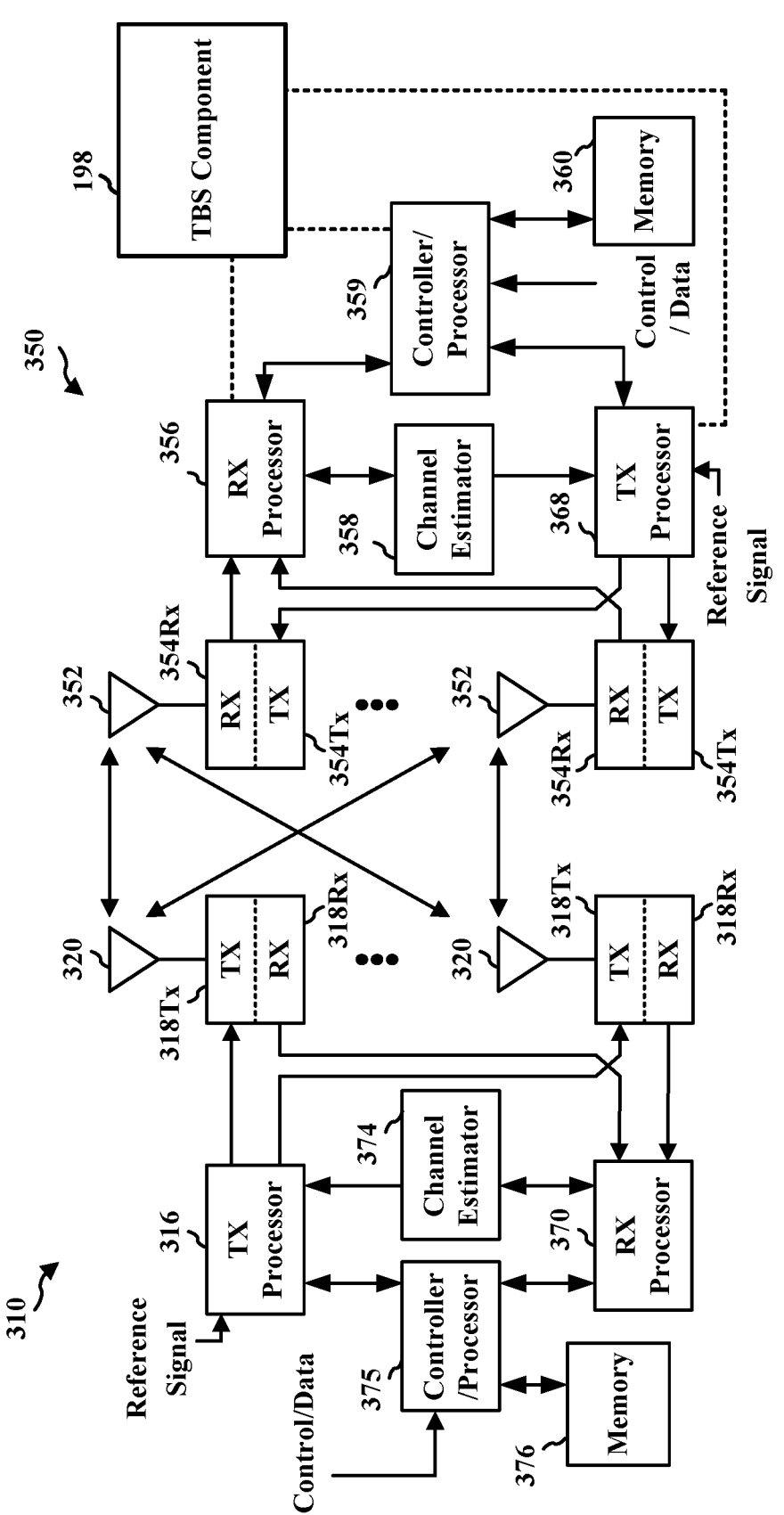
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the TBS component 198 of FIG. 1.

In wireless communication, FD capability may be present at base stations, UEs, or both. For example, at UEs, uplink transmissions may occur at one panel, while downlink receptions may occur at another panel. At base stations, uplink transmissions may occur at one panel, while downlink receptions may occur in another panel. At least one advantage of FD operation is a reduction of latency for communication. For example, FD operation may allow for the reception of downlink communication in uplink only slots, which may enable the downlink communication to be received more quickly and reduce latency. At least another advantage of FD operation may include an enhancement of spectrum efficiency per cell or per UE, as well as an increase in resource utilization.

FIGS. 4A-4C are diagrams illustrating examples of FD communication. Diagram 400 of FIG. 4A and diagram 410 of FIG. 4B include downlink 402 and uplink 404 resources. Diagrams 400 and 410 are examples of in-band full duplex where transmissions and receptions are on the same time and frequency resource. The downlink 402 and uplink 404 resources share the same in-band full duplex time and frequency resources such that there is a full overlap, as shown in diagram 400 of FIG. 4A, or a partial overlap as shown in diagram 410 of FIG. 4B. Diagram 420 of FIG. 4C also includes downlink 402 and uplink 404 resources but are separated by a guard band 406. Diagram 420 is an example of sub-band frequency domain duplexing, which may also be known as flexible duplex. The transmissions and receptions are at the same time but are on different frequency resources. The downlink 402 and uplink 404 resources may be separated from each other in the frequency domain.

Figure 5C:
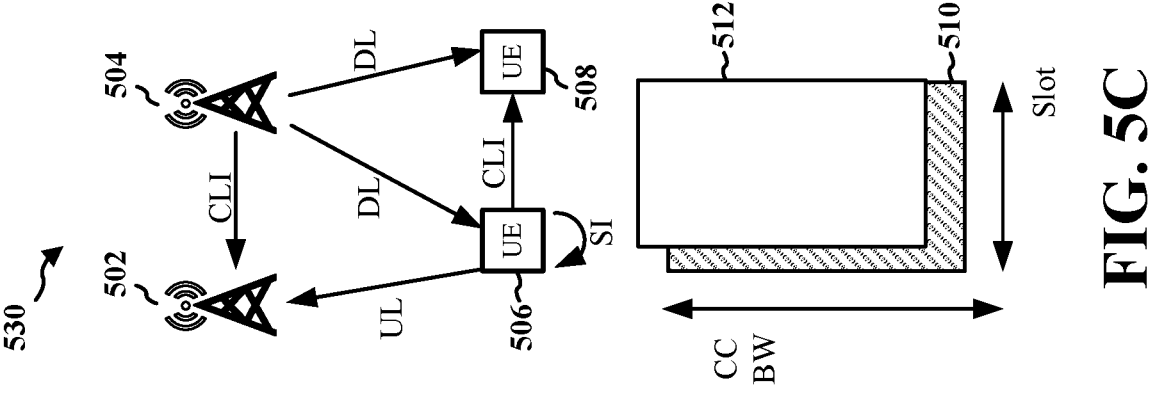
FIGS. 5A-5C are diagrams illustrating examples of full duplex communication.
Figure 5B:
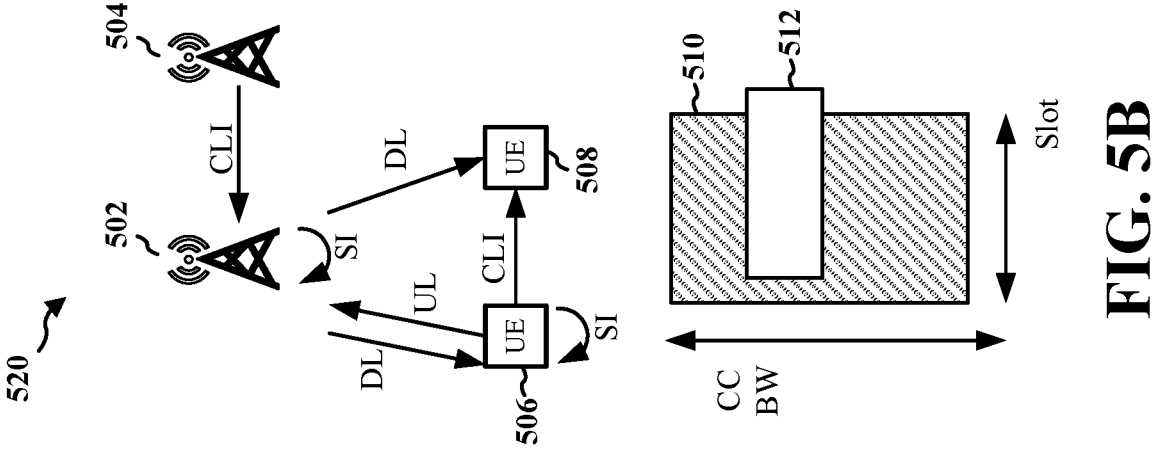
Figure 5A:
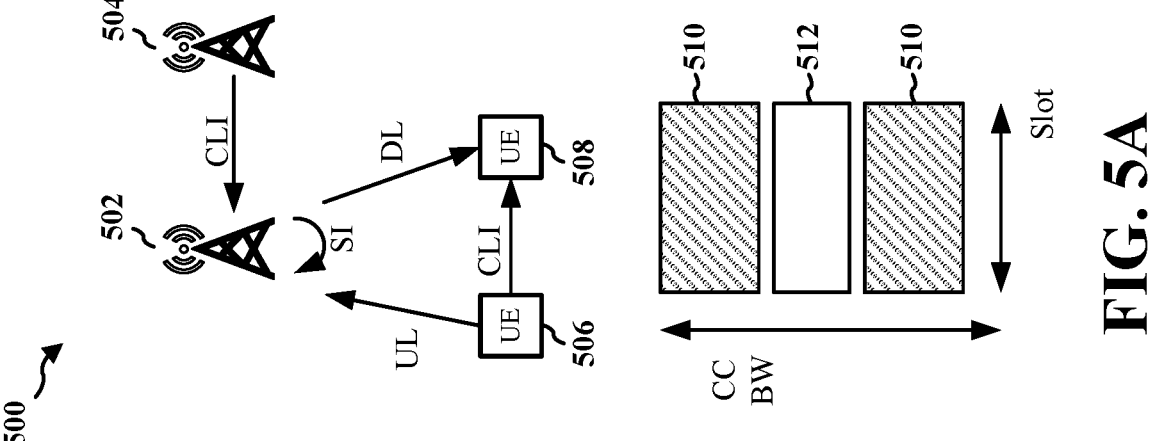

FIGS. 5A-5C are diagrams illustrating examples of FD communication. Diagram 500 is an example of a base station operating in subband full duplex mode, where the band is split between downlink 510 and uplink 512 resources. The base station 502 is operating in full duplex while the UE 506 and UE 508 are operating in half duplex. The base station 502 may receive uplink (UL) transmissions from UE 506 and may transmit downlink (DL) transmissions to UE 508. The base station 502 may experience self interference (SI) while operating in full duplex based at least on the DL transmissions to the UE 508 and the UL transmission from UE 506. The base station 502 may also experience cross link interference (CLI) from other base stations (e.g., 504) that are transmitting within the network. Diagram 520 is an example of a base station and a UE both operating in in-band full duplex mode, where there is at least some partial overlap between downlink 510 and uplink 512 resources. The base station 502 may receive UL transmissions from UE 506 and transmit DL transmissions to the UE 506. The base station 502 may also transmit DL transmissions to the UE 508. The base station 502 may experience SI while operating in full duplex based at least on the DL transmissions to UE 506 or UE 508 and the UL transmission from UE 506. The base station 502 may also experience CLI from other base stations (e.g., 504) that are transmitting within the network. The UE 506 may experience SI while operating in full duplex based at least on the UL transmission to the base station 502 and reception of the DL transmission from the base station 502. Diagram 530 is an example of a base station and a UE operating in in-band full duplex mode, where there is at least some partial overlap between downlink 510 and uplink 512 resources, while the base station 502 may be a TRP associated with base station 504. The base station 504 may transmit DL transmissions to the UE 506 and the UE 508. The base station 502 may receive UL transmissions from the UE 506. The base station 502 may experience CLI based on transmissions from base station 504 that are transmitted within the network. The UE 506 may experience SI while operating in full duplex based at least on the UL transmission to the base station 502 and the DL transmissions from the base station 502.

Figure 6:
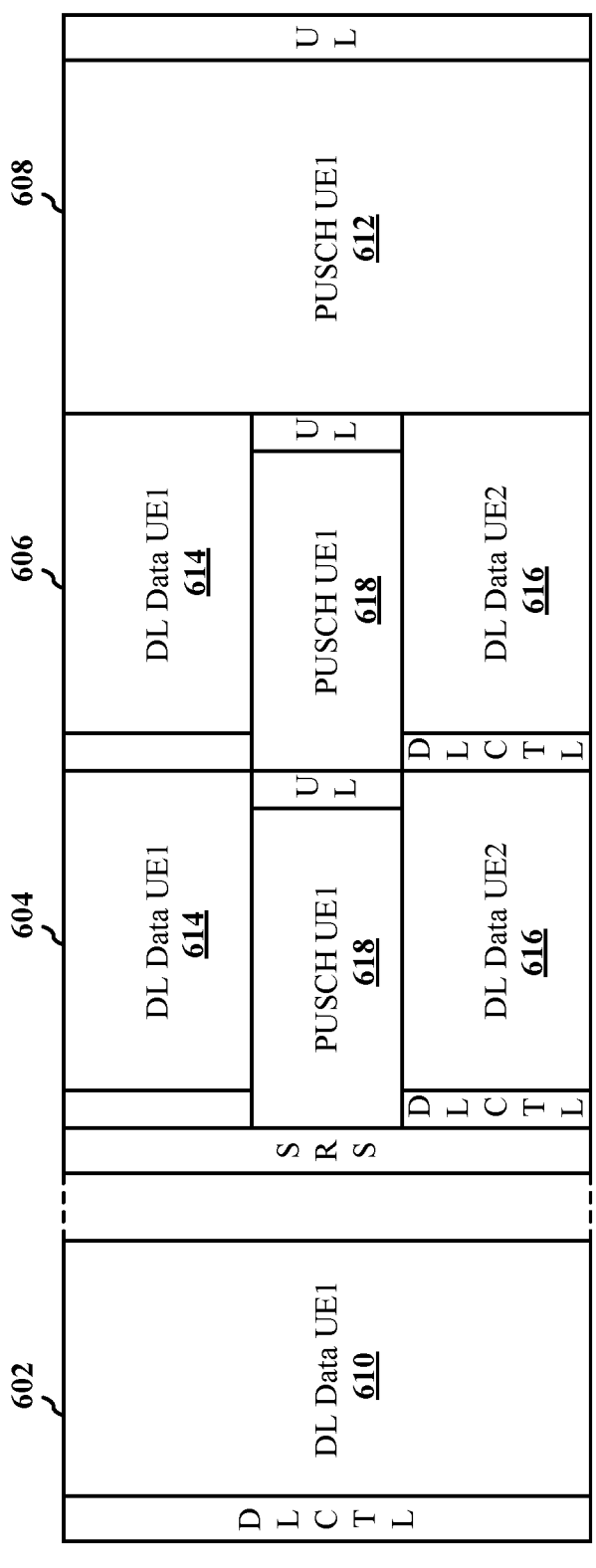
FIG. 6 is a diagram illustrating an example of a subband full duplex slot format.

FIG. 6 is a diagram illustrating an example of a subband full duplex slot format. The diagram 600 is a diagram of four slots (e.g., 602, 604, 606, 608). The first slot 602 and the last slot 608 are half duplex slots for TDD operation. The first slot 602 may comprise DL data 610, and the last slot 608 may comprise UL data (e.g., PUSCH 612). The slot 604 and slot 606 may be configured as subband FD slots. For example, slot 604 may comprise DL data 614 for a first UE (e.g., UE1) and may comprise DL data 616 for a second UE (e.g., UE2). The slot 604 may also comprise UL data (e.g., PUSCH 618) from the first UE. In yet another example, slot 606 may comprise DL data 614 for a first UE (e.g., UE1) and may comprise DL data 616 for a second UE (e.g., UE2). The slot 606 may also comprise UL data (e.g., PUSCH 618) from the first UE.

The slot format may be defined to comprise a "D+U" slot, where the "D+U" slot is a slot in which the band is used for both UL and DL transmissions. The DL and UL transmissions may occur in overlapping bands (e.g., in-band FD) or in adjacent bands (e.g., subband FD). In some instances, for a given "D+U" symbol, a half duplex UE may either transmit in the UL band or receive in the DL band. In some instances, for a given "D+U" symbol, a FD UE may transmit in the UL band and/or receive in the DL band in the same slot. A "D+U" slot may be comprised of only DL symbols, only UL symbols, or FD symbols.

Frequency domain resource allocation (FDRA) may indicate the allocated resources for transmission or reception in the frequency domain. The FDRA may be comprised within a DCI that schedules a PDSCH or a PUSCH. The FDRA may indicate a resource allocation type that indicates the manner in which RBs are allocated for UL or DL. The resource allocation type may comprise allocation Type 0 or Type 1. Allocation Type 0 may comprise a disjoint RB allocation where the RBs are bundled into resource block groups (RBGs). The RBs may be allocated into multiples of RBGs where the size of the RBG may be based on the size of the BWP and the configuration type. For example, the RBG size may be based on two different configurations, as shown below in Table 1.

TABLE 1

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Allocation Type 1 may comprise a consecutive allocation of RBs. The resource allocation area may be determined by the parameter RB_start and the number of consecutive RBs (e.g., indicating a starting RB and a number of consecutive RBs following the starting RB) which are combined in a specific value field known as the resource indicator value (RIV). The RIV may be defined by $$\text{if } (L_{RBs} - 1) \le \lfloor N_{BWP}^{size}/2 \rfloor \text{ then}$$

$$RIV = N_{BWP}^{size}(L_{RBs} - 1) + RB_{start}$$

$$\text{else } RIV = N_{BWP}^{size}(N_{BWP}^{size} - L_{RBs} + 1) + (N_{BWP}^{size} - 1 - RB_{start})$$

In wireless communications, a UE receiving data via PDSCH determines the size of the TBS prior to decoding the data. The UE may utilize information provided via RRC signaling and/or DCI over a PDCCH based on the scheduling. To determine the TBS, the UE determines the number of REs ($N_{RE}$) within the slot. A UE determines the number of REs allocated for PDSCH within a PRB $$(N'_{RE})$$

by $$N'_{RE} = N_{SC}^{RB} \cdot N_{symb}^{sh} - N_{DMRS}^{PRB} - N_{oh}^{PRB}, \text{ where } N_{sc}^{RB} = 12$$

is the number of subcarriers in a physical resource block, $$N_{symb}^{sh}$$

is the number of symbols of the PDSCH allocation within the slot, $$N_{DMRS}^{PRB}$$

is the number of REs for DM-RS per PRB in the scheduled duration including the overhead of the DM-RS CDM groups without data, and $$N_{oh}^{PRB}$$

is the overhead. The UE may determine the total number of REs allocated for PDSCH $$(N_{RE}) \text{ by } N_{RE} = \min(156, N'_{RE}) \cdot n_{PRB},$$

where $n_{PRB}$ is the total number of allocated PRBs for the UE.

In some instances, subband full duplex (SBFD) slots may have two disjoint downlink allocations or two disjoint uplink allocations. The two downlink/uplink disjoint bands may be separated by an uplink/downlink band in addition to any guard bands. For example, in Type-1 allocation, the allocation is contiguous and the downlink allocation may overlap with the uplink sub-band. In some instances, a TBS adjustment may occur and may be based on at least one of the slot type, an allocation type, or the allocation itself. An issue may arise in the determination of the TBS and/or adjustment in instances with multiple PDSCH transmissions or PDSCH repetitions, across multiple slots, where some slots are half duplex slots and some slots are full duplex slots.

Aspects presented herein provide a configuration for TBS adjustment and adaptation for multiple and repeated transmissions in full duplex networks. A UE may be configured to determine a TBS adjustment for multiple and repeated PUSCH or PDSCH across multiple slots.

Figure 7:
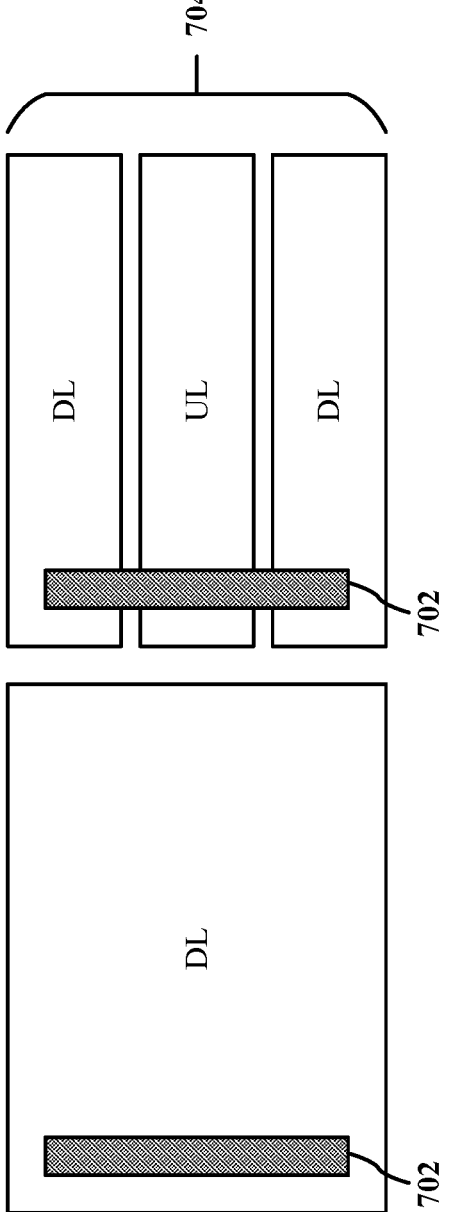
FIG. 7 is a diagram illustrating an example of a TBS.
Figure 8:
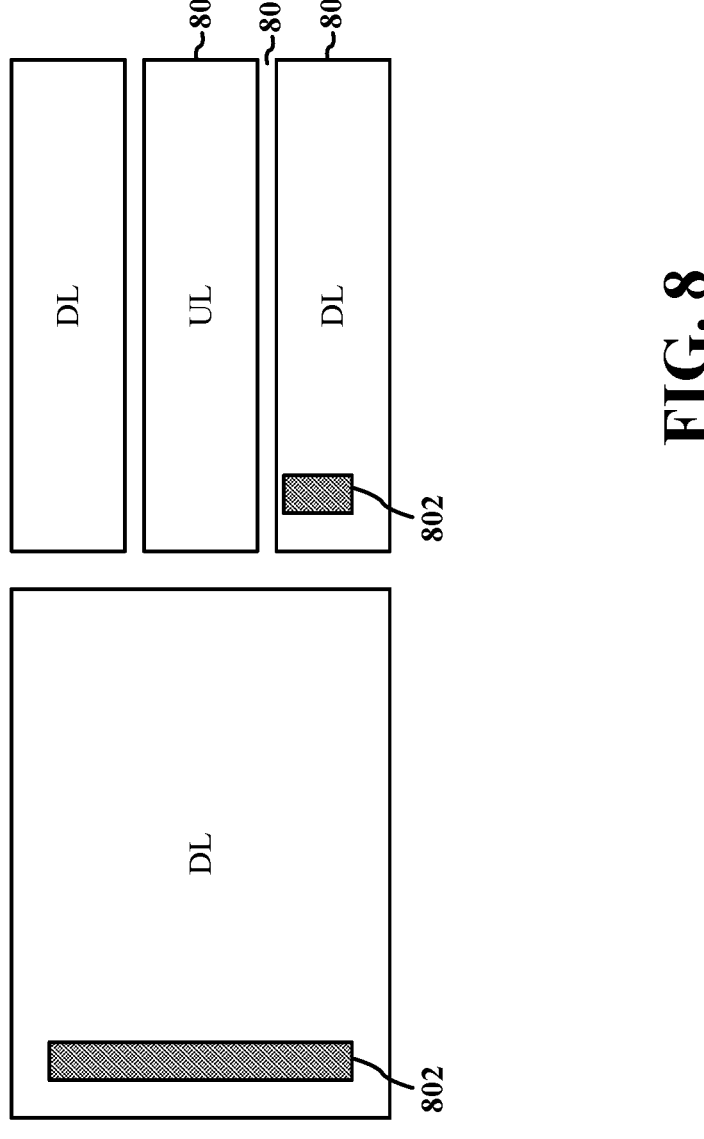
FIG. 8 is a diagram illustrating an example of a TBS adjustment.

In instances with repetition, a TBS (e.g., 702) should be the same across repetitions (e.g., 704) in order to transmit the same amount of information, as shown for example in diagram 700 of FIG. 7. If any TBS adjustment occurs, such TBS adjustment may not occur within the repetitions. In some aspects, such as instances with repetitions scheduled across different slot types, the TBS may be determined in different manners. For example, in instances with repetitions across different slot types, TBS adjustment for full duplex slots is disabled. The TBS may be calculated based on the time division duplex (TDD) slot or half duplex slot and TBS may be kept the same for all slots. In full duplex slots, resources that are not available for PDSCH may be rate-matched around. In some instances, the grant (e.g., DCI) carrying the scheduling may indicate whether the TBS adjustment occurs or not. For example, the grant carrying the scheduling may comprise a bitfield to indicate that TBS is calculated based on full duplex slots or TDD or half duplex slots. In some instances, the TBS adjustment performed according to full duplex slots may be applied to half duplex slots. In some instances, the TBS may be calculated based on the slot type of a first transmission. In some instances, the TBS adjustment may be based on the allocation of resources, such as for example, if there is no overlap between the uplink and the guard band, as shown for example in diagram 800 of FIG. 8. In diagram 800 of FIG. 8, the TBS 802 is within the downlink 804 and does no overlap between the uplink 806 and guard band 808.

In instances where a single DCI schedules multiple PDSCH, the TBS adjustment for multiple PDSCHs scheduled by the same DCI may be determined in different manners. For example, for each scheduled or configured transport block, the TBS adjustment may be based on the slot type and the allocation in time and frequency of each of the scheduled or configured transport blocks, as shown for example, in diagram 900 of FIG. 9. A TBS adjustment (e.g., 904) may be performed for grants in full duplex slots (e.g., 906) where FDRA falls outside of a downlink subband, while the TBS (e.g., 902) for a grant in a half duplex slot 908 is not adjusted. In some aspects, the TBS adjustment may be dynamically indicated for all the grants in the DCI. In some aspects, an RRC configured table that provides a time domain resource allocation (TDRA) may also provide the TBS adjustment for each grant.

In instances where a single DCI schedules over multiple carriers (e.g., 1002), the TBS adjustment (e.g., 1004, 1006, 1008), for multiple PDSCHs scheduled by the same DCI across multiple carriers may be determined such that each carrier is configured to use the TBS adjustment or to not use the TBS adjustment, or may be based on a BWP configuration, as shown for example in diagram 1000 of FIG. 10.

Figure 11:
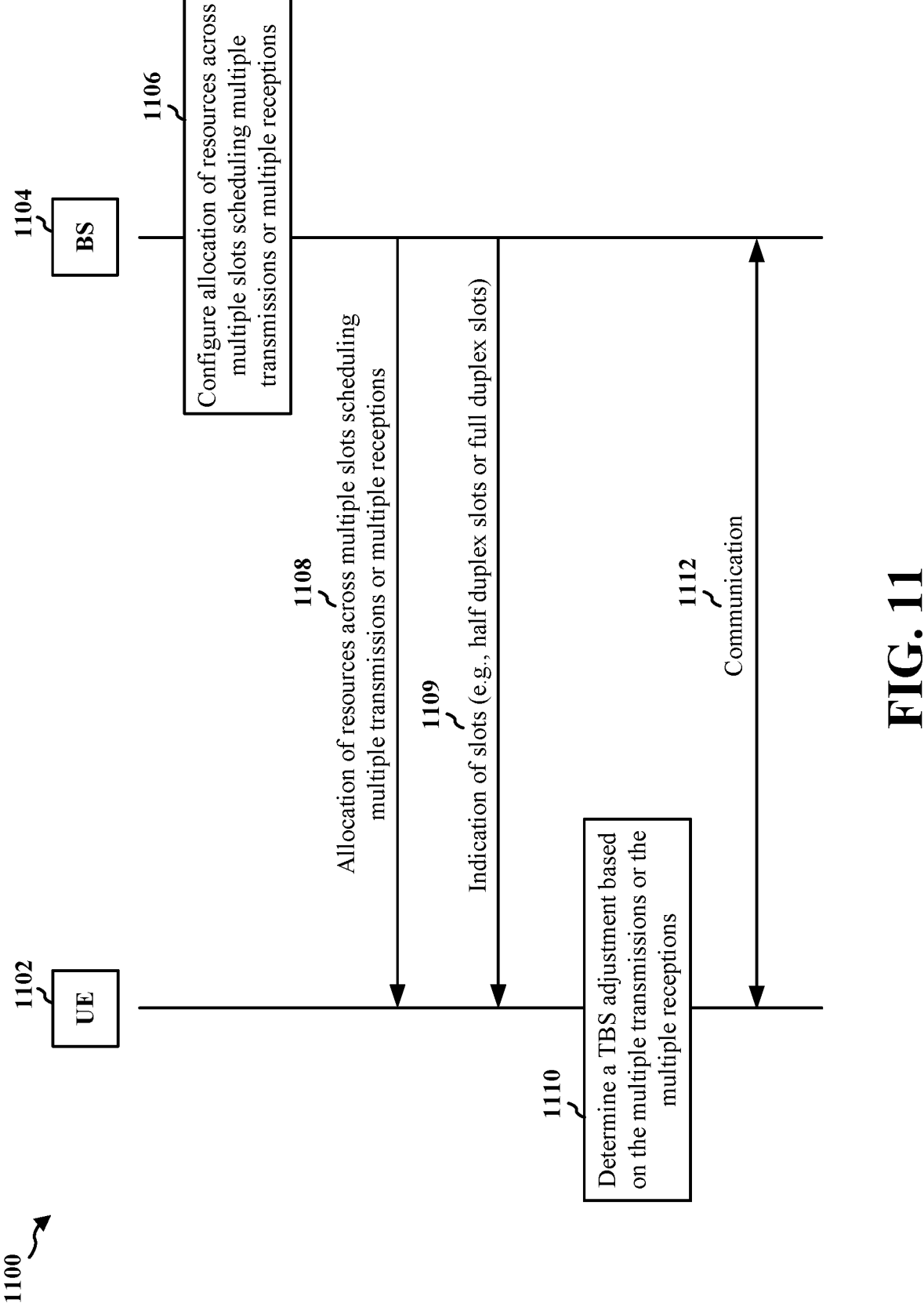
FIG. 11 is a call flow diagram of signaling between a base station and a UE.

FIG. 11 is a call flow diagram 1100 of signaling between a UE 1102 and a base station 1104. The base station 1104 may be configured to provide at least one cell. The UE 1102 may be configured to communicate with the base station 1104. For example, in the context of FIG. 1, the base station 1104 may correspond to base station 102 and the UE 1102 may correspond to at least UE 104. In another example, in the context of FIG. 3, the base station 1104 may correspond to base station 310 and the UE 1102 may correspond to UE 350.

At 1106, the base station 1104 may configure an allocation of resources across multiple slots scheduling multiple transmissions or multiple receptions. At 1108, the base station 1104 may provide the allocation of resources across multiple slots scheduling the multiple transmissions or the multiple receptions to the UE 1102. The UE 1102 may receive the allocation of resources across multiple slots scheduling the multiple transmissions or the multiple receptions from the base station 1104, as shown in connection with any of FIGS. 7-10. In some aspects, the allocation of resources may schedule multiple receptions. In some aspects, the allocation of resources may schedule multiple receptions across multiple carriers. At 1109, the base station 1104 may provide an indication of various types of slots, such as at least one half duplex slot or at least one full duplex slot.

At 1110, the UE 1102 may determine a TBS adjustment based on the multiple transmissions or the multiple receptions, as shown in connection with any of FIGS. 7-10. In some aspects, the multiple receptions may comprise repetitions across different slot types. The TBS adjustment may be based on half duplex slots and the TBS adjustment may be maintained for all slots. In some aspects, the TBS adjustment for full duplex slots may be disabled, such that resources unavailable for downlink reception are rate matched around. In some aspects, a grant scheduling the multiple transmissions or the multiple receptions may indicate whether the TBS adjustment occurs. For example, the grant may comprise a bitfield indication that indicates that the TBS adjustment is based on a half duplex slot or a full duplex slot. In some aspects, the TBS adjustment may be calculated or determined based on a slot type of a first transmission. In some aspects, a determination of the TBS adjustment may be based on the allocation of resources. In some aspects, the TBS adjustment may be based on a slot type, a time domain resource allocation, and/or a frequency domain resource allocation. In some aspects, the TBS adjustment may be dynamically indicated within the allocation of resources. In some aspects, the TBS adjustment may be based on a time domain resource allocation, wherein the time domain resource allocation is configurable or pre-configured. In some aspects, each carrier of the multiple carriers may be configured to use the TBS adjustment or to not use the TBS adjustment. In some aspects, the TBS adjustment may be based on a bandwidth part configuration of the multiple carriers.

At 1112, the UE may communicate with the base station based on the TBS adjustment. For example, the UE may transmit the multiple transmissions or receive the multiple receptions based on the TBS adjustment.

FIG. 12 is a flowchart 1200 of a method of wireless communication. The method may be performed by a UE (e.g., the UE 104; the apparatus 1304). One or more of the illustrated operations may be omitted, transposed, or contemporaneous. The method may allow a UE to determine a TBS adjusted based on multiple transmissions or multiple receptions across multiple slots.

At 1202, the UE may receive an allocation of resources across multiple slots, as shown in connection with any of FIGS. 7-10. For example, 1202 may be performed by TBS component 198 of apparatus 1304. The allocation of resources may schedule multiple transmissions or multiple receptions. In some aspects, the allocation of resources may schedule multiple receptions. In some aspects, the allocation of resources may schedule multiple receptions across multiple carriers.

At 1204, the UE may determine a TBS adjustment based on the multiple transmissions or the multiple receptions, as shown in connection with any of FIGS. 7-10. For example, 1202 may be performed by TBS component 198 of apparatus 1304. In some aspects, the multiple receptions may comprise repetitions across different slot types. The TBS adjustment may be based on half duplex slots and the TBS adjustment may be maintained for all slots. In some aspects, the TBS adjustment for full duplex slots may be disabled, such that resources unavailable for downlink reception are rate matched around. In some aspects, a grant scheduling the multiple transmissions or the multiple receptions may indicate whether the TBS adjustment occurs. For example, the grant may comprise a bitfield indication that indicates that the TBS adjustment is based on a half duplex slot or a full duplex slot. In some aspects, the TBS adjustment may be calculated or determined based on a slot type of a first transmission. In some aspects, a determination of the TBS adjustment may be based on the allocation of resources. In some aspects, the TBS adjustment may be based on a slot type, a time domain resource allocation, and/or a frequency domain resource allocation. In some aspects, the TBS adjustment may be dynamically indicated within the allocation of resources. In some aspects, the TBS adjustment may be based on a time domain resource allocation, wherein the time domain resource allocation is configurable or pre-configured. In some aspects, each carrier of the multiple carriers may be configured to use the TBS adjustment or to not use the TBS adjustment. In some aspects, the TBS adjustment may be based on a bandwidth part configuration of the multiple carriers.

At 1206, the UE may transmit the multiple transmissions or receive the multiple receptions. For example, 1206 may be performed by TBS component 198 of apparatus 1304. The UE may transmit the multiple transmissions or receive the multiple receptions based on the TBS adjustment.

Figure 13:
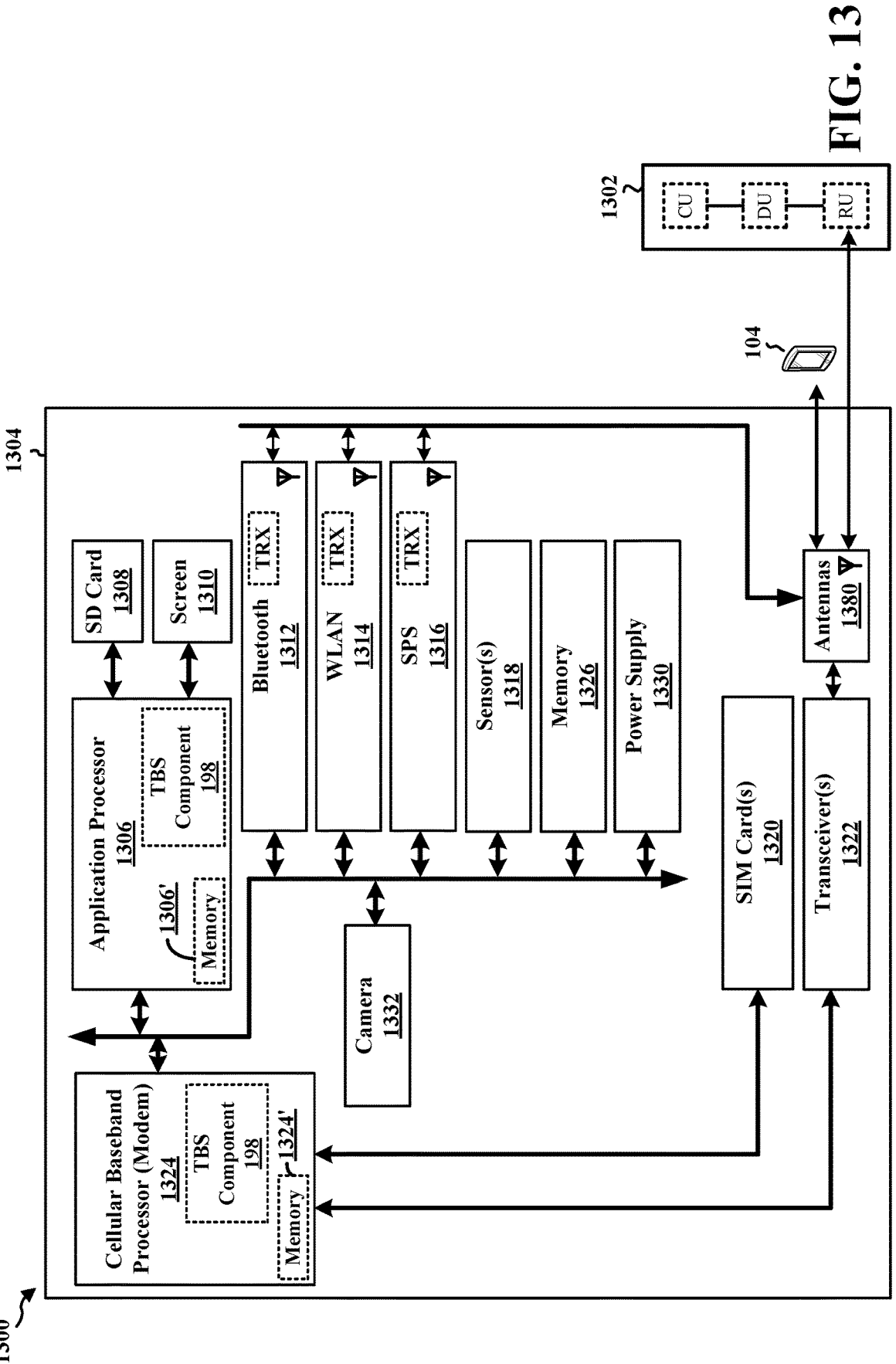
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the component 198 is configured to receive an allocation of resources across multiple slots scheduling multiple transmissions or multiple receptions; and determine a TBS adjustment based on the multiple transmissions or the multiple receptions. The component 198 may be within the cellular baseband processor 1324, the application processor 1306, or both the cellular baseband processor 1324 and the application processor 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for receiving an allocation of resources across multiple slots scheduling multiple transmissions or multiple receptions. The apparatus includes means for determining a transport block size (TBS) adjustment based on the multiple transmissions or the multiple receptions. The apparatus further includes means for transmitting the multiple transmissions or receiving the multiple receptions based on the TBS adjustment. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE comprising receiving an allocation of resources across multiple slots scheduling multiple transmissions or multiple receptions; and determining a TBS adjustment based on the multiple transmissions or the multiple receptions.

Aspect 2 is the method of aspect 1, further includes that the multiple receptions comprise repetitions across different slot types.

Aspect 3 is the method of any of aspects 1 and 2, further includes that the TBS adjustment is based on half duplex slots and is maintained for all slots.

Aspect 4 is the method of any of aspects 1-3, further includes that the TBS adjustment for full duplex slots is disabled, wherein resources unavailable for downlink reception are rate matched around.

Aspect 5 is the method of any of aspects 1-4, further includes that a grant scheduling the multiple transmissions or the multiple receptions indicates whether the TBS adjustment occurs.

Aspect 6 is the method of any of aspects 1-5, further includes that the grant comprises a bitfield indication that indicates that the TBS adjustment is based on a half duplex slot or a full duplex slot.

Aspect 7 is the method of any of aspects 1-6, further includes that the TBS adjustment is calculated based on a slot type of a first transmission.

Aspect 8 is the method of any of aspects 1-7, further includes that a determination of the TBS adjustment is based on the allocation of resources.

Aspect 9 is the method of any of aspects 1-8, further includes that the allocation of resources schedules the multiple receptions.

Aspect 10 is the method of any of aspects 1-9, further includes that the TBS adjustment is based on a slot type, a time domain resource allocation, and a frequency domain resource allocation.

Aspect 11 is the method of any of aspects 1-10, further includes that the TBS adjustment is dynamically indicated within the allocation of resources.

Aspect 12 is the method of any of aspects 1-11, further includes that the TBS adjustment is based on a time domain resource allocation, wherein the time domain resource allocation is configurable or pre-configured.

Aspect 13 is the method of any of aspects 1-12, further includes that the allocation of resources schedules the multiple receptions across multiple carriers.

Aspect 14 is the method of any of aspects 1-13, further includes that each carrier of the multiple carriers is configured to use the TBS adjustment or to not use the TBS adjustment.

Aspect 15 is the method of any of aspects 1-14, further includes that the TBS adjustment is based on a bandwidth part configuration of the multiple carriers.

Aspect 16 is the method of any of aspects 1-15, further including transmitting the multiple transmissions or receiving the multiple receptions based on the TBS adjustment.

Aspect 17 is an apparatus for wireless communication at a UE including at least one processor coupled to a memory and at least one transceiver, the at least one processor configured to implement any of Aspects 1-16.

Aspect 18 is an apparatus for wireless communication at a UE including means for implementing any of Aspects 1-16.

Aspect 19 is a computer-readable medium storing computer executable code, where the code when executed by a processor causes the processor to implement any of Aspects 1-16.

What is claimed is:

1. An apparatus for wireless communication at a user equipment (UE), comprising:
   a memory; and
   at least one processor coupled to the memory and, based at least in part on information stored in the memory, the at least one processor is configured to:
      receive an allocation of resources across multiple slots scheduling multiple transmissions or multiple receptions across multiple carriers; and
      determine a transport block size (TBS) adjustment based on the multiple transmissions or the multiple receptions, wherein the multiple slots have different slot types, wherein the multiple receptions comprise repetitions across the different slot types, and wherein each carrier of the multiple carriers is configured to use the TBS adjustment or to not use the TBS adjustment.

2. The apparatus of claim 1, further comprising a transceiver coupled to the at least one processor.

3. The apparatus of claim 1, wherein the TBS adjustment is based on half duplex slots and is maintained for all slots.

4. The apparatus of claim 3, wherein the TBS adjustment for full duplex slots is disabled, wherein resources unavailable for downlink reception are rate matched around.

5. The apparatus of claim 1, wherein a grant scheduling the multiple transmissions or the multiple receptions indicates whether the TBS adjustment occurs.

6. The apparatus of claim 5, wherein the grant comprises a bitfield indication that indicates that the TBS adjustment is based on a half duplex slot or a full duplex slot.

7. The apparatus of claim 1, wherein the TBS adjustment is calculated based on a slot type of a first transmission.

8. The apparatus of claim 1, wherein a determination of the TBS adjustment is based on the allocation of resources.

9. The apparatus of claim 1, wherein the allocation of resources schedules the multiple receptions.

10. The apparatus of claim 9, wherein the TBS adjustment is based on a slot type, a time domain resource allocation, and a frequency domain resource allocation.

11. The apparatus of claim 9, wherein the TBS adjustment is dynamically indicated within the allocation of resources.

12. The apparatus of claim 9, wherein the TBS adjustment is based on a time domain resource allocation, wherein the time domain resource allocation is configurable or pre-configured.

13. The apparatus of claim 1, wherein the allocation of resources schedules the multiple receptions across the multiple carriers.

14. The apparatus of claim 13, wherein the TBS adjustment is based on a bandwidth part configuration of the multiple carriers.

15. The apparatus of claim 1, wherein the at least one processor is configured to:
   transmit the multiple transmissions or receive the multiple receptions based on the TBS adjustment.

16. A method of wireless communication at a user equipment (UE), comprising:

receiving an allocation of resources across multiple slots scheduling multiple transmissions or multiple receptions across multiple carriers; and determining a transport block size (TBS) adjustment based on the multiple transmissions or the multiple receptions, wherein the multiple slots have different slot types, wherein the multiple receptions comprise repetitions across the different slot types, and wherein each carrier of the multiple carriers is configured to use the TBS adjustment or to not use the TBS adjustment.

17. The method of claim 16, wherein the TBS adjustment is based on half duplex slots and is maintained for all slots.

18. The method of claim 17, wherein the TBS adjustment for full duplex slots is disabled, wherein resources unavailable for downlink reception are rate matched around.

19. The method of claim 16, wherein a grant scheduling the multiple transmissions or the multiple receptions indicates whether the TBS adjustment occurs, wherein the grant comprises a bitfield indication that indicates that the TBS adjustment is based on a half duplex slot or a full duplex slot.

20. The method of claim 16, wherein the TBS adjustment is calculated based on a slot type of a first transmission.

21. The method of claim 16, wherein a determination of the TBS adjustment is based on the allocation of resources.

22. The method of claim 16, wherein the allocation of resources schedules the multiple receptions.

23. The method of claim 22, wherein the TBS adjustment is based on a slot type, a time domain resource allocation, and a frequency domain resource allocation.

24. The method of claim 22, wherein the TBS adjustment is dynamically indicated within the allocation of resources.

25. The method of claim 22, wherein the TBS adjustment is based on a time domain resource allocation, wherein the time domain resource allocation is configurable or pre-configured.

26. The method of claim 16, wherein the allocation of resources schedules the multiple receptions across the multiple carriers, wherein the TBS adjustment is based on a bandwidth part configuration of the multiple carriers.

27. An apparatus for wireless communication at a user equipment (UE), comprising:

means for receiving an allocation of resources across multiple slots scheduling multiple transmissions or multiple receptions across multiple carriers; and means for determining a transport block size (TBS) adjustment based on the multiple transmissions or the multiple receptions, wherein the multiple slots have different slot types, wherein the multiple receptions comprise repetitions across the different slot types, and wherein each carrier of the multiple carriers is configured to use the TBS adjustment or to not use the TBS adjustment.

28. A non-transitory computer-readable storage medium storing computer executable code at a user equipment (UE), the code when executed by a processor causes the processor to:

receive an allocation of resources across multiple slots scheduling multiple transmissions or multiple receptions across multiple carriers; and determine a transport block size (TBS) adjustment based on the multiple transmissions or the multiple receptions, wherein the multiple slots have different slot types, wherein the multiple receptions comprise repetitions across the different slot types, and wherein each carrier of the multiple carriers is configured to use the TBS adjustment or to not use the TBS adjustment.

* * * * *